July 1, 1958 W. C. RAINER ET AL 2,840,858
METHOD OF MAKING CLOSURES
Filed Aug. 19, 1955

INVENTORS
WILLIAM C. RAINIER
EIBE A. WILCKENS
JOSEPH G. GERMAK
JAMES P. HAMILTON
EDWARD M. REDDING
BY Cushman, Darby & Cushman
ATTORNEYS

2,840,858
METHOD OF MAKING CLOSURES

William C. Rainer, Eibe A. Wilckens, and Joseph G. Germak, Baltimore, James P. Hamilton, Glen Burnie, and Edward M. Redding, Baltimore, Md., assignors to Crown Cork & Seal Company, Baltimore, Md., a corporation of New York Application August 19, 1955, Serial No. 529,538

5 Claims. (Cl. 18—59)

This invention relates to closures such as crown, lug and screw caps of metal or plastic, and provided with cushion liners of plastic material which will form an effective seal with the lip of a container.

Figure 1:
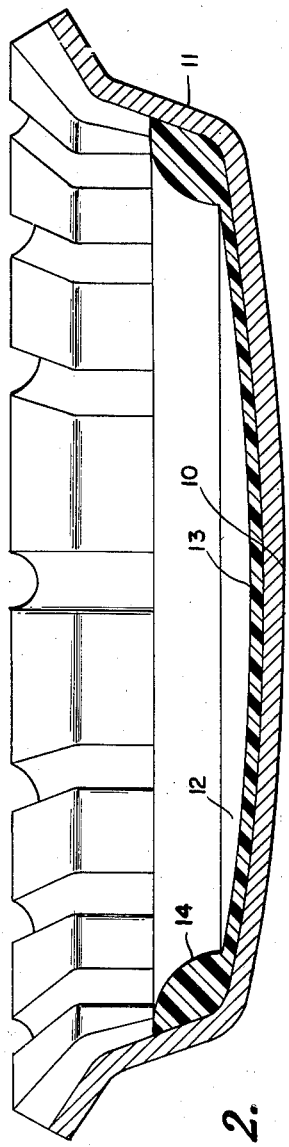
Figure 2:
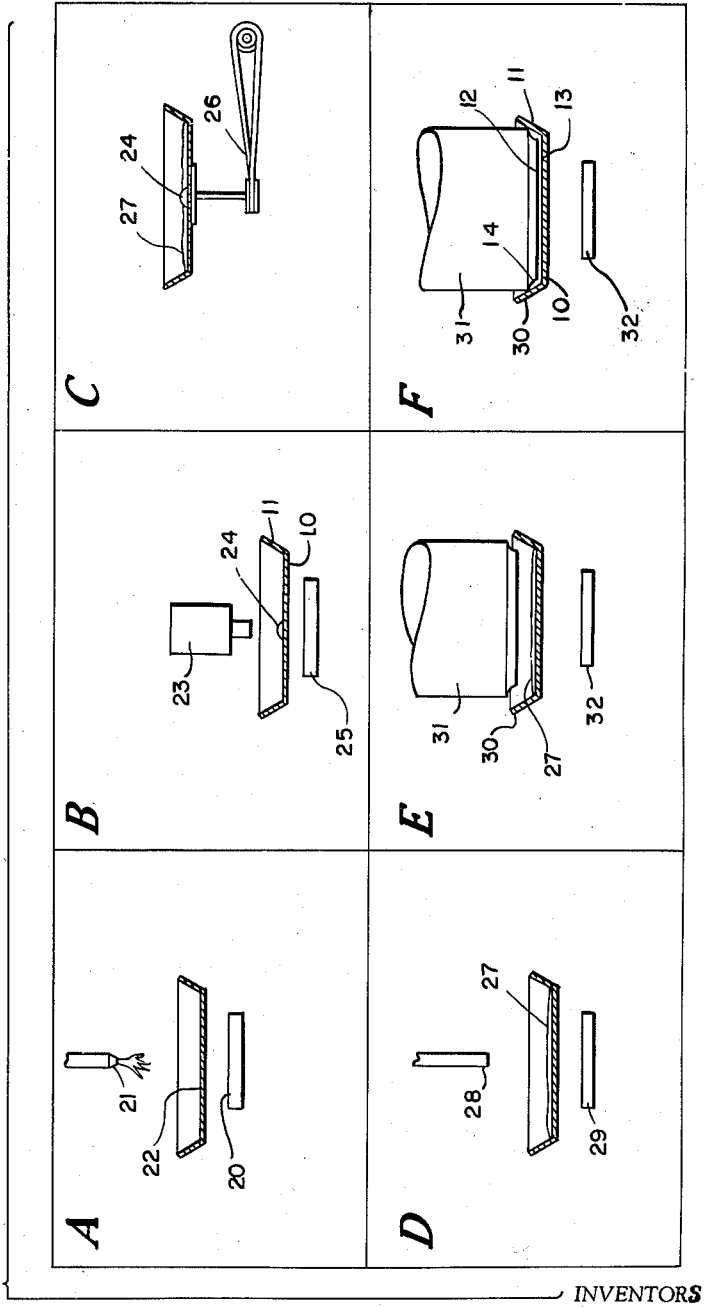

In the accompanying drawing:

Figure 1 is a cross section of a crown cap (for purposes of illustration) having an improved cushion liner therein; and Figure 2 is a flow sheet showing a method of manufacture of closures as shown in Figure 1.

Referring to Figure 1, the crown cap has a top 10, flared skirt 11 and, in the present instance, instead of the usual cork composition liner, the cushion liner 12 is formed from a plastisol and has a thin central web 13 and an integral relatively thicker substantially O-ring shaped peripheral sealing portion 14. This liner and the cap and liner assembly are produced in a manner now to be described.

The process of manufacture proceeds from the left of the flow sheet of Figure 2, as follows:

(A) The inverted crowns resting on their tops are continuously conveyed so as to pass over a platen 20 preferably heated, e. g., at about 140° to 200° F., and beneath a gas flame 21 which plays on the inside top surfaces 22 of the crowns, whereby to preheat them to a temperature in the neighborhood of 140° to 200° F., and drive off any lubricant residue from the usual stamping press, so as to assure a good adhesion of the plastisol to the inner crown surface 22.

(B) Into the so preheated crowns substantially centrally thereof is deposited from the reservoir 23 a charge 24 of the plastisol having a temperature of about 70° to 100° F.

(C) Instead of operation (B), the plastisol charge is delivered to the caps while the same are being traveled and simultaneously are being spun at about 1000 R. P. M. (the speed can be as low as 500 R. P. M.) by any suitable means as shown at 26, such as a pulley-operated support, to thereby distribute the plastisol as a thin continuous liner or layer 27 of substantially uniform thickness which terminates at the junction of the skirt with the top of the cap shell.

(D) The crowns from operation (C) having this layer 27 coextensive with the area of the top 22 of the crowns are then heated, preferably by a radiant heater 28 from above so as to be subjected briefly to a skin-forming temperature, e. g., about 190° to 250° F. In this manner, a skin or surface of film-like form is produced on the exposed surface of the liner layer 27 to maintain its shape, and to rigidify the liner layer 27 without, however, completely curing the plastisol or disturbing its molding quality. In some cases a heated platen 29 is disposed below the crowns on the conveyor in conjunction with the radiant heater 28, so as to effect substantially a full cure of the plastisol, e. g., at about 300° to 350° F.

(E—F) The skin-forming step of operation (D) is preferable, but need not be resorted to where the caps are immediately transferred from operations (B) or (C) on the conveyor, to a final plastic curing and final liner-forming stage on a conventional rotating heated pressure dial 30. That is, the closures, with or without such skin from operations (B), (C) or (D) and with the plastisol in incompletely cured condition and capable of further forming and shaping, are subjected to heat and pressure in said dial to effect such final curing and shaping. The closures and plastic liner therein have a temperature of about 140° to 200° F., when introduced to the dial, and there is usually some difference in temperature between the plastic per se and the metal shell. In the dial, the pressure plunger engages the plastisol for about 3½ seconds or less, so as to avoid creating off-taste in the product in contact therewith, decomposition of the plastisol, overcuring of the same and sticking of the plastisol to the forming plunger.

The dial-shaping plunger 31 and its cooperating dial-supporting table 32 over which the caps rotate, are at a temperature to impart to the plastisol a temperature of 300° to 360° F., whereby, not only is the plastisol shaped to final form, as shown in Figure 1, but is also simultaneously substantially completely cured. The fully cured plastisol may, likewise, be shaped to final form by the dial-shaping plunger 31, as shown in Figure 1.

Where the caps are fed to the dial and discharged therefrom at a rate of about 220 per minute, they are on the dial a total of only about 11 seconds; and where this is increased to a rate of 340 caps per minute, the closures are on the dial a total of only about 6 or 7 seconds. In any instance, it is preferred not to allow the heated pressure plunger 31 to contact the plastic for more than about 3½ seconds.

It also is possible to completely cure the plastisol in operation (D) by applying heat from the underside of the crown, and while the plastic is still at the curing temperature to mold it to the final contour.

At E is shown the pressure plunger 31 of the dial about to engage a charge or glob of plastic 24 from operation (B), or a layer 27 from operation (C) or a layer 27 with a surface skin or fully cured plastisol from operation (D).

At F is shown the plunger 31 in engagement with said charge 24 or layer 27 to shape and mold a liner to the contour and structure of Figure 1.

Where there is a differential in the temperature of the plastic and the metal of the shell, e. g., the plastic has a temperature of 90° to 140° F., and the metal more, e. g., 120° to 180° F., the dial plunger will have a temperature of about 300° F., while the heated table 32 of the dial will have a temperature of about 340° to 360° F.

This differential is a matter of heat transfer and where it does not exist, both the forming plunger and heated platen or table may have substantially the same temperature, e. g., 300° F. At lower temperatures, the feed to and discharge from the dial are slower, while at higher temperatures, this proportionately is increased.

The metal shells 10 are lacquered or coated with a conventional protective film before introducing the plastisol. One such lacquer is a vinyl lacquer, e. g., 80% of a vinylchloride-vinylacetate copolymer (87% vinylchloride) together with 20% of an oleoresinous modifier, e. g., tung oil modified phenyl phenol-formaldehyde, dissolved in an organic solvent, such as 70% xylene and 30% isophorone with 20% solids. More volatile solvents, such as toluene, methylethyl ketone and methyl isobutyl ketone can also be employed. As an alternative lacquer there can be used 80% of a vinylchloride-vinyl acetate-maleic anhydride terpolymer prepared from monomers in the respective ratios of 87:12:1 together with 20% of a o-cresol-formaldehyde resin dissolved in any of the above mentioned solvents or mixture of solvents.

In the above example, the plastisol employed had the following composition by weight:

| | Parts |
|---|---|
| Geon 121 (polyvinyl chloride having a molecular weight of about 89,000) | 60 |
| Dioctyl phthalate (di-2-ethylhexyl phthalate) | 40 |
| Calcium stearate | 3 |
| Staybelite No. 10 (glycerol ester of hydrogenated rosin) | 3 |

Below are given examples of other compositions which may be utilized.

*Compositions in parts by weight*

1

| | Parts |
|---|---|
| Exon 654 (a vinyl chloride polymer having a molecular weight of about 89,000) | 56 |
| Geon 202 (a vinyl chloride-trichlorethylene copolymer having a molecular weight of about 49,000 and containing at least 95% vinyl chloride) | 4 |
| Dioctyl phthalate | 40 |
| Paraplex G-62 (a polymeric dihydric alchhol-dicarboxylic acid-ester-epoxide, specifically a glycol-sebacate-epoxide) | 3 |
| Staybelite No. 10 | 3 |

2

| | |
|---|---|
| Exon 654 | 56 |
| Geon 202 | 4 |
| Dioctyl phthalate | 50 |
| Paraplex G-62 | 5 |
| Staybelite No. 10 | 5 |

3

| | |
|---|---|
| Vinylite QYNV (high molecular weight polyvinyl chloride) | 56 |
| Geon 202 | 4 |
| DOP-20 (dioctyl phthalate) | 30 |
| Paraplex G-62 | 3 |
| Goodrite GP-261 | 10 |

4

| | |
|---|---|
| Geon 121 | 60 |
| DOP-20 | 40 |
| Paraplex G-62 | 3 |
| Staybelite No. 10 | 3 |

The use of Geon 202 which is a vinyl chloride-trichloroethlyene copolymer containing a small amount of trichloroethylene, is especially advantageous. By reason of its molecular configuration and particle size the copolymer cited has an initial, as well as lasting, influence on the viscosity behavior of any given plastisol system in which it functions as a constituent. By its mere presence it depresses initial viscosity and develops longer shelf-life in the plastisol. In general, the copolymer is employed in an amount of from 2 to 10 parts per 100 parts of the total resin content.

In general the following proportions of the various materials forming the plastisol can be used:

| | Parts |
|---|---|
| Vinyl chloride polymer or copolymer | 100 |
| Plasticizer | 60 to 150 |
| Filler | 0 to 150 |
| Stabilizer | 1 to 10 |
| Glyceryl ester of hydrogenated rosin | 0 to 10 |

When a filler is employed, it is preferably present in an amount from 20 to 100 parts per 100 parts of polymer. The glyceryl ester of hydrogenated rosin reduces the migration of the plasticizer in the plastisol and when employed is preferably present in an amount of at least 5 parts per 100 parts of polymer.

A plastisol is defined as a mixture of a resin or other high polymer with a plasticizer in which it is essentially insoluble at room temperature or very slowly soluble at room temperature, but in which it is essentially completely soluble at some elevated temperature or slowly soluble on standing at room temperature. When a mixture of the resin and plasticizer is heated, the resin dissolves in the hot plasticizer and, when the solution cools, a permanent gel is formed.

The preferred plastisols of this invention employ polyvinyl chloride or a copolymer of vinyl chloride with a minor amount of a copolymerizable, ethylenically unsaturated monomer as the resin.

The forms of the invention herewith shown and described are to be taken as the preferred embodiment of the same and various changes may be made without departing from the spirit of the invention or the scope of the appended claims.

We claim:

1. The method which comprises heating a metal closure to drive off residual stamping lubricant, depositing a charge of plastisol centrally of the closure while spinning the latter at a high R. P. M., and thereby spreading the same as a uniform layer coextensive with the undersurface of the cap, completely curing the plastisol and thereafter shaping the same into a cushion liner in said closure with the aid of a pressure plunger.

2. The method according to claim 1, wherein the metal closure is supported upon a heated support and the plunger for shaping the plastisol is also heated, the temperature of said heated support being substantially above the temperature of said shaping plunger.

3. The method according to claim 2, wherein the temperature of said heated support is 40° to 60° F. above the temperature of said shaping plunger.

4. The method according to claim 3, wherein the plastisol is a vinyl chloride plastisol and the temperature of said heated support is from about 340° to 360° F. and the temperature of said shaping plunger is about 300° F.

5. The method according to claim 1 wherein the plastisol is a vinyl chloride resin plastisol.

References Cited in the file of this patent

UNITED STATES PATENTS

| 1,956,012 | Egan | Apr. 24, 1934 |
| 2,553,590 | Joswig | May 22, 1950 |
| 2,654,914 | Maier | Oct. 13, 1953 |
| 2,663,908 | Maier et al. | Dec. 29, 1953 |
| 2,663,909 | Maier et al. | Dec. 29, 1953 |